United States Patent [19]
Steadman et al.

[11] Patent Number: 5,663,567
[45] Date of Patent: Sep. 2, 1997

[54] APPARATUS FOR DETECTING ALPHA RADIATION IN DIFFICULT ACCESS AREAS

[75] Inventors: Peter Steadman, Santa Fe; Duncan W. MacArthur, Los Alamos, both of N. Mex.

[73] Assignee: The Regents of the University of California, Oakland, Calif.

[21] Appl. No.: 657,744

[22] Filed: May 31, 1996

[51] Int. Cl.[6] .................................................. G01T 1/18
[52] U.S. Cl. ................................... 250/382; 250/374
[58] Field of Search ............................ 250/382, 385.1, 250/374, 375, 376, 383, 388

[56] References Cited

U.S. PATENT DOCUMENTS

| | | | |
|---|---|---|---|
| 5,326,976 | 7/1994 | Kikuchi | 250/385.1 |
| 5,514,872 | 5/1996 | Bolton et al. | 250/385.1 |

*Primary Examiner*—David P. Porta
*Assistant Examiner*—Richard Hanig
*Attorney, Agent, or Firm*—Milton D. Wyrick; William A. Eklund

[57] ABSTRACT

An electrostatic alpha radiation detector for measuring alpha radiation emitted from inside an enclosure comprising an electrically conductive expandable electrode for insertion into the enclosure. After insertion, the electrically conductive expandable electrode is insulated from the enclosure and defines a decay cavity between the electrically conductive expandable electrode and the enclosure so that air ions generated in the decay cavity are electrostatically captured by the electrically conductive expandable electrode and the enclosure when an electric potential is applied between the electrically conductive expandable electrode and the enclosure. Indicator means are attached to the electrically conductive expandable electrode for indicating an electrical current produced by generation of the air ions generated in the decay cavity by collisions between air molecules and the alpha particles emitted from the enclosure. A voltage source is connected between the indicator means and the electrically conductive enclosure for creating an electric field between the electrically conductive expandable electrode and the enclosure.

8 Claims, 4 Drawing Sheets

APPARATUS FOR DETECTING ALPHA RADIATION IN DIFFICULT ACCESS AREAS

FIELD OF THE INVENTION

The present invention generally relates to the detection of alpha radiation, and, more specifically, to apparatus for detecting alpha radiation in difficult access areas, such as glove boxes. This invention was made with Government support under Contract No. W-7405-ENG-36 awarded by the U.S. Department of Energy. The Government has certain rights in the invention.

The strong alpha signature of transuranics, uranium, radium and other radioactive contaminants, coupled with the relatively high energies involved in alpha decays makes alpha detection the preferred method for locating and measuring radioactive contamination. However, it is well known that alpha particles travel only small distances in air until all of their initial energy is dissipated through interactions with air molecules. This distance is on the order of 3.5 cm, often times is too short a distance to allow detection by most commercially available detectors.

Alpha particles deposit their energy in the air by separating the charge that resides in air molecules, creating pairs of positive and negative ions. These air ions, because they can be transported further than the range of the alpha particle, provide a mechanism by which the original alpha radiation can be detected remotely. Inventions regarding detection of alpha radiation by means of these air ions have termed their detection as "Long Range Alpha Detection."

The present invention provides apparatus for detecting alpha radiation in areas difficult to access, such as glove boxes. It is based on technology which is contained in several U.S. Patents which disclose various devices for the long range detection of alpha particles. The first is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The fourth is U.S. Pat. No. 5,281,824, issued Jan. 25, 1994, for Radioactive Detection. The fifth is U.S. Pat. No. 5,311,025, issued May 10, 1994, for Fan-less Long Range Alpha Detector. Another recently filed application bears Ser. No. 08/333,020, filed Nov. 1, 1994, entitled "Event Counting Alpha Detector." Still other recently filed applications bear Ser. No. 08/382,333, filed Feb. 1, 1995, entitled "Background Canceling Surface Alpha Detector," Ser. No. 08/395,934, filed Feb. 27, 1995, entitled "High Air Flow Alpha Detector," (having received a Notice of Allowability dated Nov. 29, 1995), Ser. No. 08/456,272, filed May 31, 1995 entitled "Segmented Surface Alpha Detector," Ser. No. 08/531,998, filed Sep. 21, 1995, entitled "Gamma Ray Detector," Ser. No. 08/606,794, filed Feb. 27, 1996, entitled "Beta Particle Monitor for Air and Objects," and Ser. No. 08/607,672, filed Feb. 27, 1996, entitled "Beta Particle Monitor."

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within a few centimeters of the source of the radiation. Also, these conventional alpha particle detectors, in a single measurement, only can scan an area approximately equal to the size of the detector.

Prior to the development of the long range alpha detection technology, alpha contamination, because of its short range in air, could not be detected if it originated in a space that was too small for insertion of a conventional monitor. Conventional detectors have normally been employed in personnel screening, when moved slowly in close proximity to a person's body. Workers in nuclear processing facilities must place their hands and feet on sensors when moving from room to room. All of this can slow operations, as it is not currently possible to adequately screen personnel within a reasonably short period of time.

It is also extremely difficult to monitor equipment and surfaces for alpha contamination, again due to the limited range of alpha particles in air. Because of the monitoring difficulty, equipment that has been used in a potentially contaminated area is often classified as potentially contaminated, and its further use is restricted to other controlled areas, or even discarded prior to the end of its useful life. If such equipment could be effectively monitored for contamination, the equipment could be released for use in uncontrolled areas. Previously, contamination inside assemblies has been impossible to detect without dismantling the assembly.

The present invention provides apparatus for incorporation with the long range alpha detection technology to allow for monitoring for alpha detection inside difficult to access enclosures, such as gloveboxes, tanks and barrels. The invention allows such monitoring through its application of an expandable detection electrode employed as an electrostatic alpha detector.

It is therefore an object of the present invention to provide apparatus that allows for detecting alpha radiation inside enclosures.

It is another object of the present invention to provide apparatus for the detection of alpha radiation that can be inserted into an enclosure in a deflated or otherwise compacted state and later expanded to an appropriate size inside the enclosure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided an electrostatic alpha radiation detector for measuring alpha radiation emitted from inside an enclosure comprising an electrically conductive expandable electrode for insertion into the enclosure. After insertion, the electrically conductive expandable electrode is insulated from the electrically conductive enclosure and defines a decay cavity between the electrically conductive expandable electrode and the electrically conductive enclosure so that air ions generated in the decay cavity are electrostatically captured by the electrically conductive expandable electrode and the enclosure when an electric potential is applied between the electrically conductive expandable electrode and the enclosure. Indicator means are attached to the electrically conductive expandable electrode for indicating an electrical current produced by generation of the air ions generated in the decay cavity by collisions between air molecules and the alpha particles emitted from the electrically conductive enclosure. A voltage source is connected between the indicator means and the electrically conductive enclosure for creating an electric field between the electrically conductive expandable electrode and the enclosure.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for detecting alpha radiation from within enclosures in which conventional radiation detectors cannot be utilized. The invention can be understood most easily through reference to the drawings.

Figure 1:
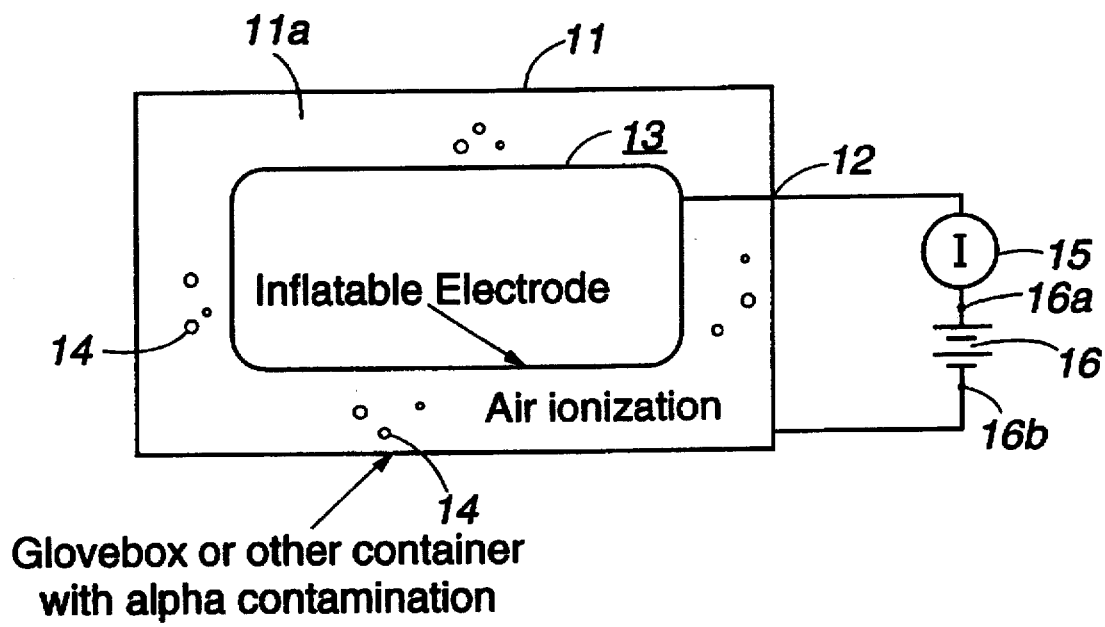
FIG. 1 is a schematical illustration of a general enclosure in which an electrically conductive expandable electrode according to the present invention has been inserted in such a way as to provide a decay cavity between the electrode and the enclosure, along with the associated indicator and voltage source.

Referring first to FIG. 1, there can be seen enclosure 11, assumed to be at least partially electrically conductive, which offers only a small entry 12 into its interior 11a. Expandable electrode 13 has been inserted through entry 12 into enclosure 11 and expanded by use of an air compressor (not shown) in the case of an inflatable expandable electrode 13, or by any other appropriate means for otherwise expandable electrodes. The space between expandable electrode 13 and the interior of enclosure 11 provides a cavity for alpha radiation to collide with air molecules to form air ions 14.

As shown, expandable electrode 13 is connected to electrometer 15, which is in turn connected to terminal 16a of voltage source 16. Terminal 16b of voltage source 16 is connected to enclosure 11. Voltage source 16 may be any source of voltage capable of producing 200 volts or greater. In many applications voltage source may be a battery. However, it may be advantageous to use an alternating current source, which also could be used.

Expandable electrode 13 is made of an expandable electrically conductive material, and must be capable of being folded into a compact configuration for insertion through small openings. One material capable of meeting these requirements is aluminized mylar. Expandable electrode 13 could have many configurations, such as umbrella-like or balloon.

With a voltage existing between expandable electrode 13 and enclosure 11, air ions 14 will be attracted to either expandable electrode 13 or to the electrically conductive portion of enclosure 11 depending on the polarity of air ions 14. Air ions 14 collected by expandable electrode 13 will create a small current which will flow through electrometer 15. Electrometer 15 then will indicate the current flow which will be proportional to the alpha activity in enclosure 11.

Figure 2:
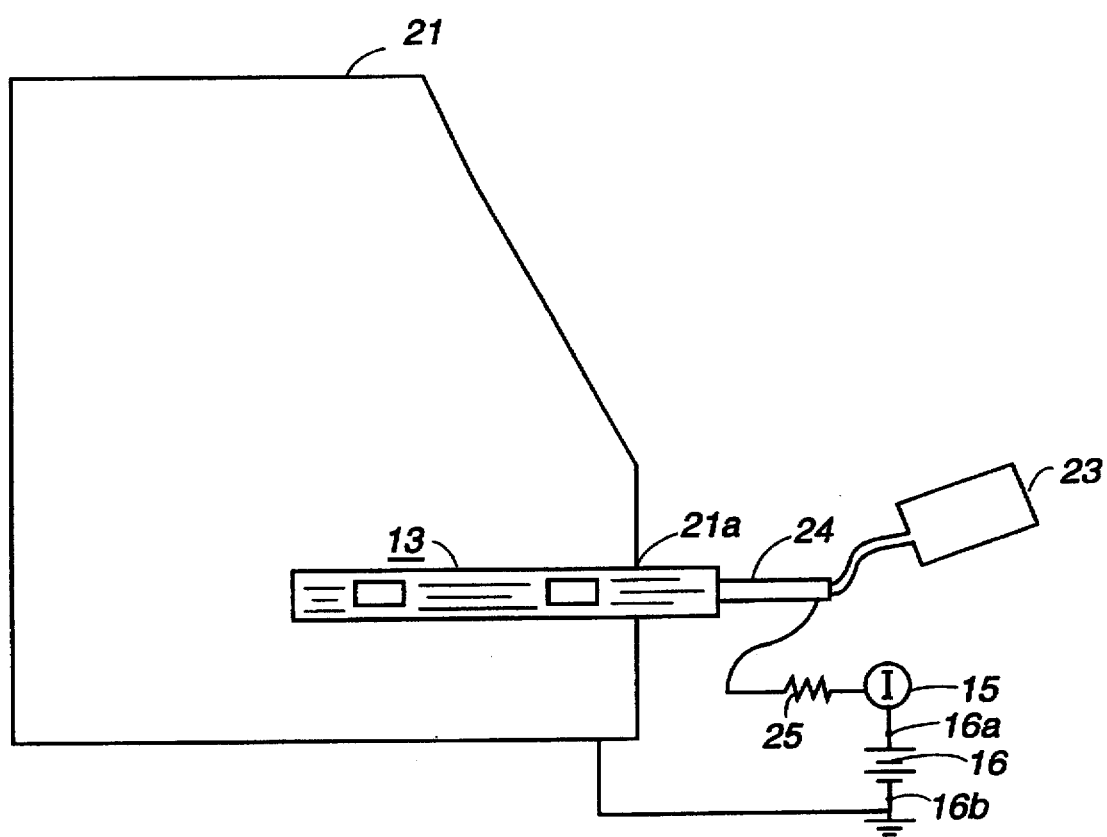
FIG. 2 is a cross-sectional side view of a glovebox with a folded electrically conductive expandable electrode according to the present invention being inserted into the glovebox along with insulative stand-offs for maintaining a decay cavity between the electrode and the glovebox.

One practical application of the present invention will be use in gloveboxes to determine the level of radioactive contamination contained inside. FIG. 2 is a cross-sectional side view of glovebox 21 with expandable electrode 13 being inserted through glove opening 21a in a folded, unexpanded state. Glovebox 21 is a combination of electrically conductor and plastic windows. Insulative stand-offs 22 are folded against expandable electrode 13 as it is being inserted into glovebox 21. Inflation tube 24 is connected to expandable electrode 13 and is connected to air compressor 23 for filling expandable electrode 13 with air after it has been inserted into glovebox 21.

Figure 3:
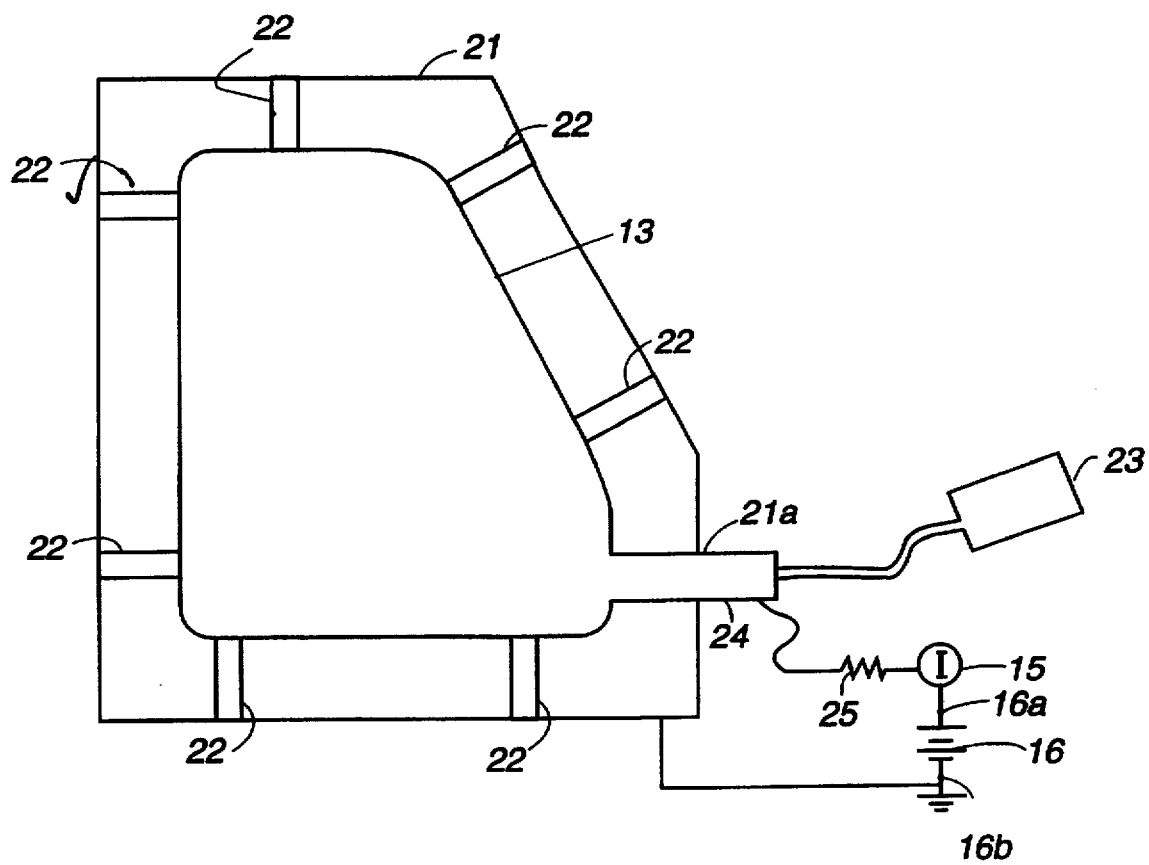
FIG. 3 is a cross-sectional side view of a glovebox with an expanded electrically conductive expandable electrode according to the present invention inside the glovebox with insulative stand-offs in place for maintaining a decay cavity between the electrode and the glovebox.

Reference should now be made to FIG. 3. After expandable electrode 13 has been inserted into glovebox 21, air compressor 23 fills expandable electrode 13 through inflation tube 24. As expandable electrode 13 is inflated, insulative stand-offs 22 become erect and serve to maintain a clearance of 3–6 inches between glovebox 21 and expandable electrode 13. As previously discussed, this clearance area provides a cavity in which any emitted alpha radiation can interact with air molecules to create air ions 14 (FIG. 1).

Insulative stand-offs 22 are constructed so that they are capable of collapsing against expandable electrode 13 during insertion into an enclosure. After insertion, insulative stand-offs 22 become erect and provide the necessary isolation of expandable electrode 13 from glovebox 21 or any other enclosure to be monitored for radiation. Insulative stand-offs 22 may be made of any reasonably rigid material such as LEXAN® (thermoplastic carbonate-linked polymers) or TEFLON® (tetrafluoroethylene).

As is shown schematically in FIGS. 2 and 3, expandable electrode 13 is connected to electrometer 15 through resistance 25, and electrometer 15 is connected to terminal 16a of voltage source 16. Terminal 16b of voltage source 16 is connected to ground 26 and to glovebox 21. Resistance 25 is not required for operation of the invention. The only purpose of resistance 25 is to reduce the shock hazard of the present invention. If used, it could have a value of approximately 1–100 megohms.

EXAMPLE

Figure 4:
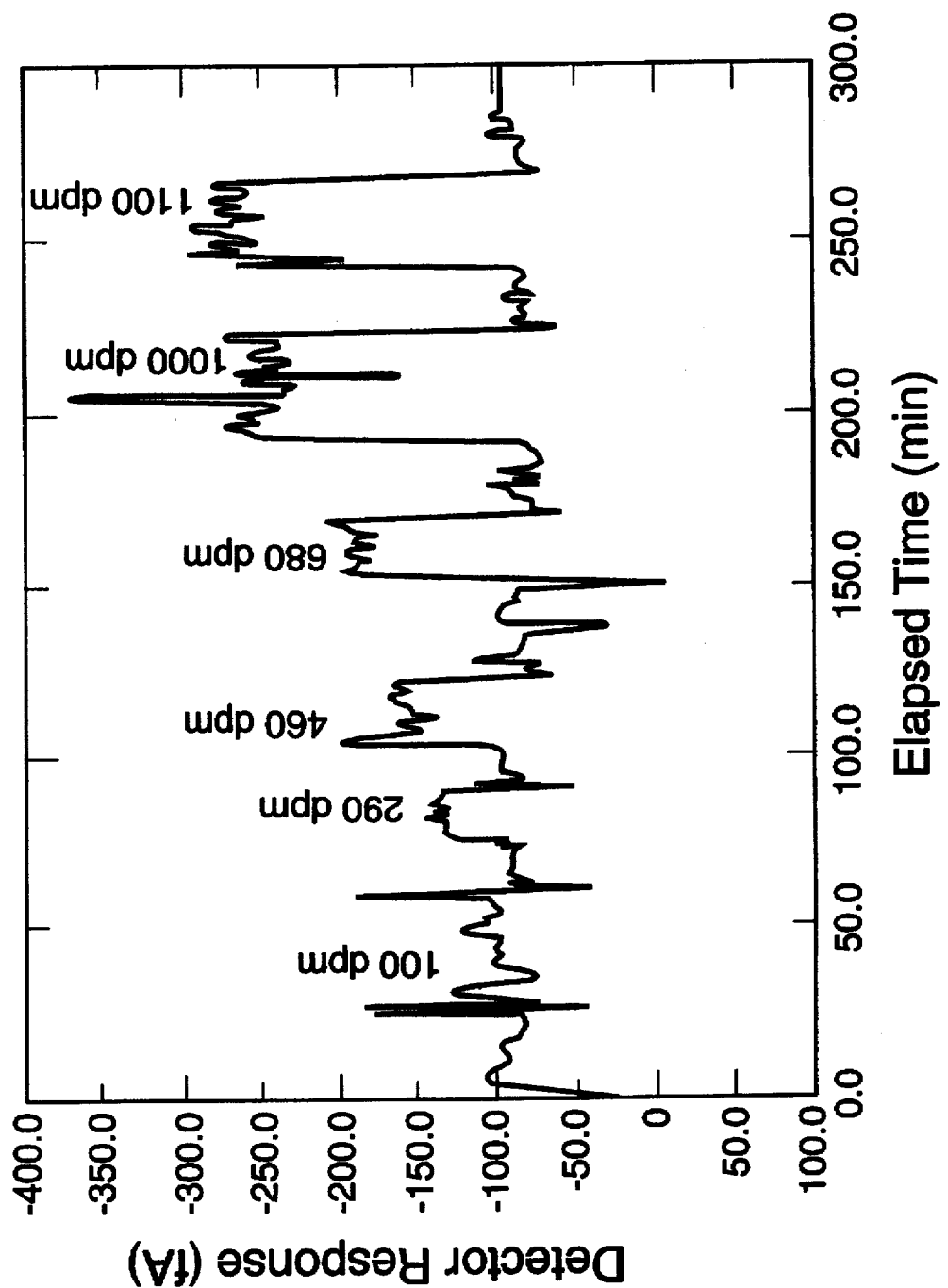
FIG. 4 is a plot of the calibration data obtained from an embodiment of the present invention.

A calibration test was run using a rectangularly shaped expandable electrode 13 inserted within a metal enclosure, and maintained approximately two inches from the walls of the box. Expandable electrode 13 was connected to a 300 V battery through a Keithley electrometer. The outputs for this calibration were measured in disintegrations per minute (dpm), and are illustrated in FIG. 4 for the various radioactive sources indicated. Each source was placed inside the metal enclosure for a period of 60 seconds. FIG. 4 clearly illustrates the excellent response of the present invention to alpha activity inside an enclosure.

It is clear that the present invention can be used to monitor many types of enclosures which are difficult or impossible for other types of radiation detectors to monitor. Although different configurations of expandable electrode 13 would be used for different applications, the efficiency of the detection would be similar. Among the applications for the present invention would be empty barrels which may be contaminated, the space at the top of storage tank at the Hanford facility, tanks of all kinds, and the interior of short pipes and ducts.

Although the use of the invention is primarily suited to electrostatic applications, it can also be used in conjunction with airflow long-range alpha detectors as disclosed in the previously referenced patents and applications.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrostatic alpha radiation detector for measuring alpha radiation emitted from inside an enclosure comprising:

an electrically conductive expandable electrode for insertion into said enclosure, after insertion said electrically conductive expandable electrode being insulated from said enclosure and defining a decay cavity between said electrically conductive expandable electrode and said enclosure so that air ions generated in said decay cavity are electrostatically captured by said electrically conductive expandable electrode and said enclosure when an electric potential is applied between said electrically conductive expandable electrode and said enclosure;

indicator means attached to said electrically conductive expandable electrode for indicating an electrical current produced by generation of said air ions generated in said decay cavity by collisions between air molecules and said alpha particles emitted from said enclosure; and a voltage source connected between said indicator means and said enclosure for creating an electric field between said electrically conductive expandable electrode and said enclosure.

2. The electrostatic alpha radiation detector as described in claim 1, wherein said voltage source comprises a battery having a voltage between equal to 200 VDC or greater.

3. The electrostatic alpha radiation detector as described in claim 1, wherein said voltage source comprises a source of at least 200 VAC.

4. The electrostatic alpha radiation detector as described in claim 1, wherein said indicator means comprises an electrometer.

5. The electrostatic alpha radiation detector as described in claim 1, wherein said electrically conductive expandable electrode comprises aluminized mylar.

6. The electrostatic alpha radiation detector as described in claim 1 further comprising a plurality of insulating stand-offs attached to said electrically conductive enclosure for insulatively maintaining said decay cavity between said electrically conductive expandable electrode and said enclosure, said insulating stand-offs being collapsible against said electrically conductive expandable electrode during insertion of said electrically conductive expandable electrode into said enclosure.

7. The electrostatic alpha radiation detector as described in claim 6, wherein said plurality of insulating stand-offs are made of tetrafluoroethylene.

8. The electrostatic alpha radiation detector as described in claim 7, wherein said plurality of insulating stand-offs are made of thermoplastic carbonate-linked polymers.

* * * * *